Aug. 6, 1968  R. L. PETTEFER  3,396,100

PROCESS FOR SEPARATING OIL-WATER MIXTURES

Filed Sept. 24, 1965

INVENTOR
ROBERT L. PETTEFER
BY HIS ATTORNEYS
HARRIS, KIECH, RUSSELL & KERN

United States Patent Office 3,396,100
Patented Aug. 6, 1968

3,396,100
PROCESS FOR SEPARATING OIL-WATER
MIXTURES
Robert L. Pettefer, Long Beach, Calif., assignor to Petrolite Corporation, St. Louis, Mo., a corporation of Delaware
Filed Sept. 24, 1965, Ser. No. 489,911
15 Claims. (Cl. 208—188)

ABSTRACT OF THE DISCLOSURE

Oily water bleeds from desalting equipment or other water-oil separators are clarified and a sludge layer between oil and water bodies in the separating vessel is kept from progressively building up by introducing a light hydrocarbon, such as kerosene or naphtha, in subdivided form into the water body below the sludge layer or more directly into the sludge layer.

---

Figure 1:
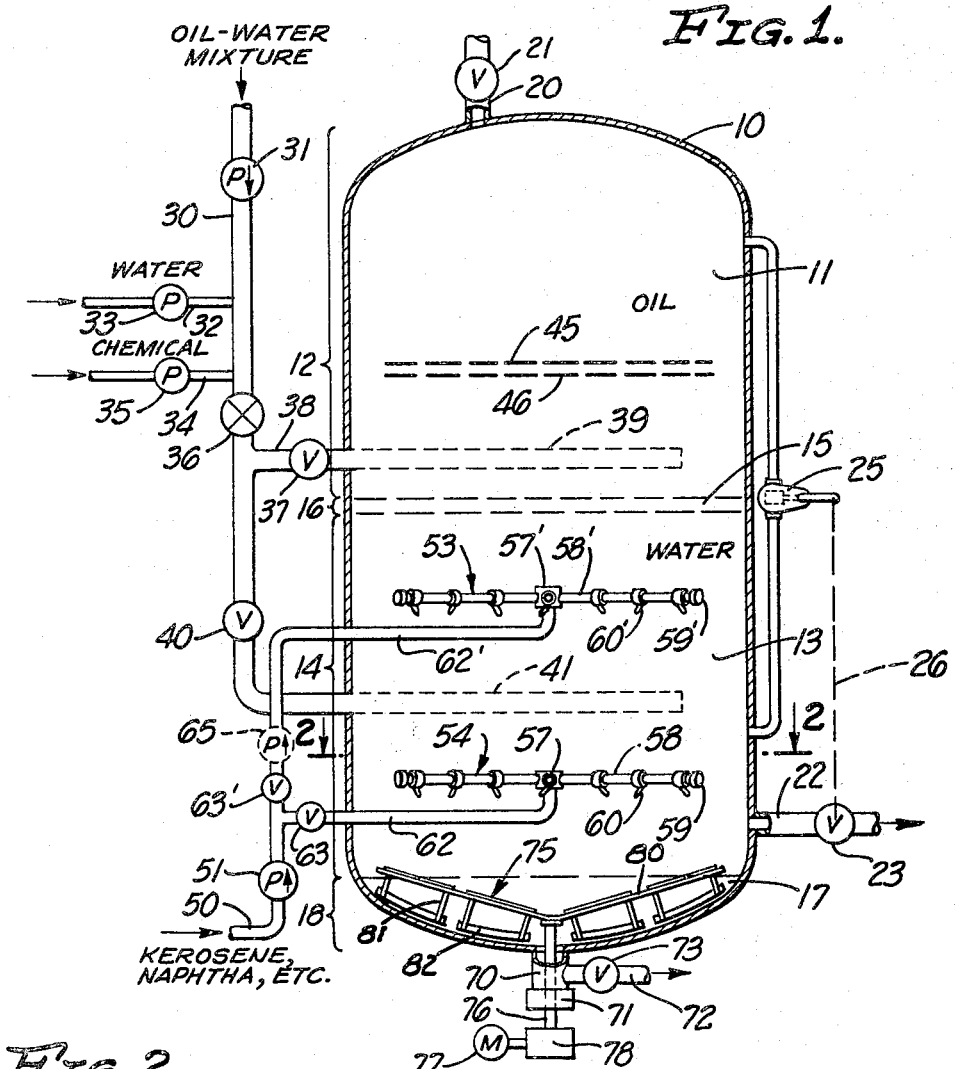

This invention relates to the separation of oil-water mixtures containing materials that tend to impede the gravitational separation of the constituents into oil and water without substantial contamination of one by the other. It is particularly useful in the desalting of crude oils or the treatment of residual oils that represent a composite of waste or spoiled products produced in a modern refinery. The process and apparatus of the invention are capable of separating from the oil various materials associated therewith or present in the oil-water mixture undergoing treatment, e.g. moisture, salts, clay and other types of dirt or solid impurities that are present.

Salts may be present in crude oils as suspended brine droplets or crystals that have resisted prior dehydration steps because of the presence of emulsifying or stabilizing agents present in the oil. Suspended solids, such as sand or dirt particles, are also present in many instances and gravitational separation thereof is impeded by such stabilizing agents. It is conventional to desalt such oils by mixing therewith a less brackish water, hereinafter referred to merely as fresh water, and separate the resulting mixture by gravity. The resulting action and the salt extraction are assisted in many instances by use of heat, chemical demulsifying agents and/or the use of high-voltage electric fields. Changes in oil production techniques, e.g. use of secondary recovery methods, have made it progressively more difficult to desalt many salty oils. One problem, solved by the invention, is the tendency toward oil-contaminated water bleeds from the desalting equipment. The oily water presents a disposal problem, not to mention the loss of oil which if recovered could be used as a fuel oil or returned to the desalted oil for subsequent cracking or processing to produce petroleum products of higher value.

Similar separation problems are encountered in the treatment of residual oils in an attempt to separate therefrom materials such as water, salts, waste reaction products and suspended solids. Prior attempts to treat residual oils to recover a useful fuel oil or a stock that can be further refined, have involved use of many expedients including direct treatment by mixing fresh water with the residual oil in a desalting technique such as mentioned above. In most instances however separation into oil and clean oil-free water is not accomplished. The oily water bleeds give rise to problems similar to those mentioned above. In addition, the separation and withdrawal of suspended solids is difficult and sometimes never accomplished. It has been proposed also to blend the residual oil with a salty oil that is being desalted by the technique noted above. By this means it is often possible to separate the mixed constituents of the residual oil, albeit with accentuated problems of oil-contaminated water bleeds, separation of solids, etc.

In the gravitational separation of such oil-water systems and indeed in the separation of practically all other oil-water systems by continuous processes, there is seldom formed a clean planar interface between separated bodies of the oil and the water. Rather, an interfacial cuff or sludge layer tends to form in an interfacial zone between these bodies. This sludge layer represents an oil-water system in the process of being separated but is often stabilized by emulsifying agents including but not limited to water-insoluble solids from the oil. These stabilizing agents tend to hold the water and solids suspended in the interfacial zone. In a continuous process, resolution of such a sludge must be effected at a rate equal to that at which the sludge tends to build up. If the interfacial material is permitted to accumulate progressively the interfacial cuff will progressively deepen and the separation process will in time become ineffective. Even under equilibrium conditions, with no substantial deepening or progressive accumulation of the interfacial material in the interfacial zone, it is often impossible to separate the oil-water mixture into the desired bodies of clean or substantially oil-free water and oil substantially free of water.

I have found that existing interfacial cuffs can be reduced in size or substantially eliminated by delivering to the interfacial zone in subdivided form a water-insoluble oil diluent. This diluent is of higher API gravity than the oil of the oil-water mixture and of lower density than the water in the water body below the interfacial zone. Being thus lighter or of lower specific gravity than the water, the diluent will rise therein if introduced into the water below the interfacial zone. The preferred diluent is kerosene or naphtha but any petroleum fraction boiling in the range of about 150°–625° F. can be used.

I have found further that such a diluent or petroleum fraction delivered to the interfacial zone acts to release solids otherwise tending to be retained therein, these solids joining other solids which tend to settle in the water body to form a solids layer therebeneath.

I have found also that if such a diluent or petroleum fraction is discharged into an oil-contaminated body of separated water below the interfacial zone it will clear this water body. In this respect the diluent is preferably injected into the water body in subdivided form, as by being discharged thereinto at a plurality of positions in a horizontal plane below the interfacial zone and preferably by being further subdivided at each position to rise as drops or discrete masses through the water to the interfacial zone.

It is an object of the invention to deliver such a diluent or petroleum fraction to an interfacial zone between bodies of oil and water to obtain any or all of the above results and to facilitate separation of an oil-water mixture into an oil body relatively free of residual water and a water body relatively free of oil droplets. A further object is to subdivide such a diluent or petroleum fraction into the body of water to rise therein to the interfacial zone.

Another object of the invention is to provide an improved process and apparatus for removing from the equipment the solids that are separated by such a process with the aid of a diluent or petroleum fraction delivered to the interfacial zone. In this connection it is an object of the invention to mechanically sweep such separated solids toward a solids outlet during the time that a portion of the water from the water body is being withdrawn therethrough, thereby remingling the solids and the withdrawn water. The solids can subsequently be separated from the water thus withdrawn.

Further objects and advantages of the invention will be evident to those skilled in the art from the following description of exemplary steps and equipment useful in the invention.

Figure 2:
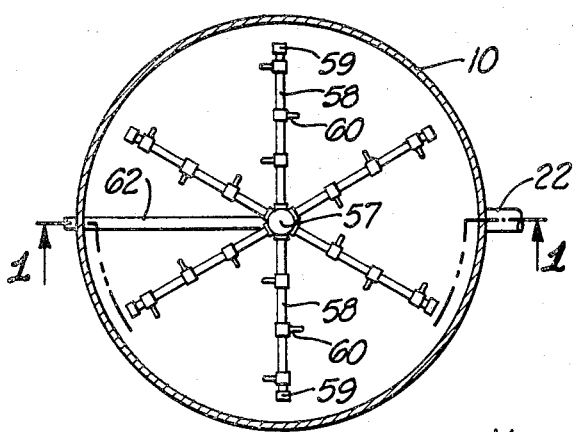

Referring to the drawing, FIG. 1 is a diagrammatic sectional view showing one embodiment of an oil-water separator of the invention or in which the invention can be practiced, FIG. 2 being a sectional view taken along the section line 2—2 of FIG. 1 and FIG. 1 being taken along the section line 1—1 of FIG. 2.

While the invention can be practiced in a settling vessel of any shape and whether oriented vertically or horizontally, FIG. 1 discloses an upright settling vessel 10 providing a settling zone containing a body of separated oil 11 in an oil zone 12 in the upper interior thereof and a body of separated water 13 in a water zone 14 thereof, with an interfacial cuff 15 in an interfacial zone 16 between the zones 12 and 14. A layer of solids 17 is shown in the bottom of the vessel in a solids zone 18 thereof. Separated oil may be discharged from the top of the vessel through an oil outlet 20 opening on the oil body 11 and equipped with a back-pressure valve 21. Likewise separated water may be withdrawn from the body of water 13 through a water outlet 22 opening thereon and equipped with a valve 23. This valve is commonly connected to a level-control system that maintains the interfacial zone 16 at a substantially uniform level in the vessel 10. This level-control system may include any suitable level-responsive means 25 connected to the valve 23 through any suitable connection means 26 to accomplish this result. The equipment thus far described is well known in the art.

The salty oil or the incoming oil-water mixture is advanced along an inlet pipe 30 and is usually pressured by a pump 31 therein. In the desalting process or when separating other oil-water mixtures, including but not limited to the residual oils mentioned above, about 1–15% by volume of fresh water may be delivered to the inlet pipe 30 through a side pipe 32 and a pump 33. A chemical agent may likewise be introduced through a branch pipe 34 and a pump 35. This chemical agent may be an alkali such as sodium hydroxide or any of the well known organic demulsifying agents that will act to destabilize the oil-water mixture entering the vessel 10 and facilitate its separation into oil and water. The water and/or chemical proportioned into the pipe 30 may be mixed with the stream therein by a mixing valve 36 or other suitable mixing device.

By opening a valve 37 in a branch pipe 38 the resulting mixture can be discharged into the lower portion of the oil zone 12 through a multi-orifice distributor such as a perforated pipe 39. In this instance the initial separation will be in an oil environment. If it is desired that the initial separation be in a water environment the valve 37 may be closed and a valve 40 opened to deliver the mixture to a perforated pipe 41 or other multi-orifice distributor in the water zone 14. Regardless of the position of introduction, the oil-water mixture will desirably settle in the vessel 10 to produce the bodies of oil 11 and water 13. The resolution and separation can be facilitated by disposing electrode grids 45 and 46 in the oil zone 11 and maintaining these at different potentials to establish a high-voltage electrostatic field therebetween.

In normal continuous operation the oil-water mixture introduced into the vessel 10 will desirably separate into an oil body 11 substantially free of dispersed water, usually to the extent of containing no more than about .5% thereof; a body of water 13, now containing the salts or water-soluble materials of the incoming oil-water mixture but substantially free of oil droplets; and a very shallow interfacial cuff 15 in the interfacial zone 16. If solids are present in the oil-water mixture these will largely separate to the solids zone 18 with some portion of the solids being retained in and undergoing separation in the interfacial zone 16.

Many oil-water systems will not continue to separate in this ideal manner. The water body 13 may become progressively contaminated by dispersed oil particles, leading to oily water bleeds through the water outlet 22. Alternatively or contemporaneously the interfacial cuff 15 may deepen so that the sludge or interfacial material progressively accumulates or builds up in height to such an extent as to decrease the volumes available for the oil and water bodies or even prevent the continued separation into the desired oil substantially free of water and water substantially free of oil. It is under these conditions that the invention becomes particularly useful.

According to the invention, the material of the interfacial cuff in the interfacial zone 16 is diluted by delivering thereto a diluent in subdivided form. This diluent may comprise any petroleum fraction of higher API gravity than the oil of the oil-water mixture entering the vessel. It should be water insoluble and should have a lower density than the water of the water body 13. Kerosene or naphtha is the preferred material but other petroleum fractions boiling in the range of about 150° F.–625° F. can be satisfactorily employed. Such materials are readily soluble in the oil of the interfacial material. If desired a small amount of an organic chemical demulsifying agent may be mixed with the diluent that is used but this is not essential to the effectiveness of the process.

The oil diluent is preferably introduced directly into the water body 13 in subdivided form. A stream thereof may be drawn from any suitable source through a pipe 50 by a pump 51 and subdivided into the water body 13 by either of two spray or orificed devices 53 or 54 positioned at different elevations. Each of these orificed devices may be any suitable assembly of perforated pipes with orifices disposed at a plurality of positions in a horizontal plane. In FIGS. 1 and 2 the lower device 54 is exemplified as including a central manifold 57 with radial pipes 58 closed at their outer ends by caps 59 and providing nozzles 60 at different radial positions. The diluent is supplied to the manifold 57 through a pipe 62 opening on the pipe 50 when a valve 63 is open. The stream is subdivided as it leaves the manifold 57 and is preferably further subdivided into drops or masses during discharge from the nozzles 60. The orifices provided by these nozzles may face in any desired direction but excellent results have been achieved by disposing the nozzles in a downwardly-inclined relation with the nozzles on each radial pipe 58 being angled in different directions as shown.

The upper orificed device 53 may be of the same construction and is shown with its elements indicated by primed numerals. It can be brought into play by closing the valve 63 and opening the valve 63'. While use of a single orificed device is usually satisfactory, two devices at different levels provide versatility in selecting an injection level giving the best results on the particular oil-water mixture being separated. Additionally, two such devices permit a mode of operation in which the oil diluent is added to water withdrawn at one level, usually the lower level, and discharged at another level, usually the upper level. Such a water circulation can be obtained by installing a circulation pump 65 in the pipe 62', oil diluent being introduced into the circulating water stream by the pump 51.

Whether using one or two orificed devices, the diluent should be injected into the separation zone of the vessel 10 in a horizontal plane no higher than the top of the interfacial zone 16 and preferably into the body of water 13 at a level no higher than the lower boundary of the interfacial zone. In clearing oil-contaminated water bodies it is desirable that the oil diluent be injected in a lower horizontal plane that is actually within the body of water 13 as shown.

The oil diluent can be supplied continuously but it is often sufficient to supply it periodically when contaminated oil bleeds appear or the interfacial cuff 15 builds up. The volume of oil diluent required is quite small and is not particularly critical. About 1–4% of the oil diluent, based on the volume of the salty oil or the oil of the influent oil-water mixture, will give satisfactory results. The same amount of oil diluent added to the stream in the inlet pipe 30 shows no significant improvement in the process. To effect significant improvement in separation by adding the same diluent to the incoming stream usually requires an amount of diluent some 10-fold higher than the amount required to produce satisfactory separation if the diluent is injected into the water zone 14 of the settling vessel 10.

In processes in which separation takes place at superatmospheric temperatures it is often desirable to heat the diluent to a temperature within about 50° F. below or above the temperature of the contents of the vessel. Best results are obtained in some instances if the diluent is at a temperature substantially the same as the vessel contents but in other instances heating of the diluent is not critical and indeed unnecessary.

The action of the oil diluent rising to or introduced adjacent the interfacial zone 16 is not fully understood. If introduced at a level significantly below the interfacial zone the oil diluent appears to sweep water-dispersed oil droplets upward to this zone during rise of the oil diluent through the water because of its lower density and immiscibility therewith. Upon reaching the interfacial zone the oil diluent dilutes the oil in situ therein and seems to release solids that may have collected in undue concentration therein. Such released solids then drop through the water body 13 to the solids layer 17. The oil diluent is ultimately withdrawn from the vessel 10 as a part of the desalted or treated oil issuing from the oil outlet 20. It is thus not lost in the process and indeed produces a higher quality effluent oil.

The solids released from the interfacial zone by the injection of the oil diluent join solids that have previously settled to form the solids layer 17 in the bottom of the vessel. Progressive accumulation of such solids presents a problem and often requires shut-down of the process and drainage of the vessel 10 to effect its removal. In accordance with the invention the solids can be removed through a solids outlet shown as including a sizeable depending pipe 70 equipped with a gland 71 and a horizontal pipe 72 in which a valve 73 is positioned. Upon opening of the valve 73 the pressure in the vessel 10 will force a stream of water from the body 13 downward and outward through the pipes 70 and 72. Solids from the solids layer 17 are mechanically swept into this water stream by slow rotation of a paddle system 75 turned by a shaft 76 extending through the gland 71 and driven by a motor 77 through a gear-reduction unit 78. The top of the shaft 76 carries radial arms 80 having paired depending arms 81 with paddle members 82 carried by the lower ends of the arms at a position in contact with or a small distance above the bottom wall of the vessel 10. The paddle members 82 may be radial but are preferably angled slightly from a radial orientation to extend in a direction tangential to a circle coaxial with the shaft 76, thus imparting to the solids a pressure component moving them toward the solids outlet. The direction of rotation of the paddle structure 75 is such that the solids are mechanically swept toward the outlet and join the water being withdrawn therefrom. The solids of the water issuing from the pipe 72 are easily separated in any conventional manner as by being gravitationally separated from the water in any suitable container.

In normal operation the solids are withdrawn only periodically from the solids outlet. The motor 77 can be periodically energized for a matter of minutes to withdraw the solids that have collected. The paddles structure should be rotated very slowly as it is undesirable to create such turbulence as would cause the solids to be remixed with the water throughout the lower portion of the vessel 10. It is desired that the paddle members 82 plow the solids toward the outlet to mingle with the stream of water being withdrawn therethrough. It is frequently desirable to employ a time switch to start the motor 77 and simultaneously open the valve 73 several times a day during continued operation of the equipment.

Operation of the invention and its unexpected advantages in the operation of desalting plants is evidenced by the following exampes.

Example 1

This desalter included a horizontal pressure vessel 30' long and 12' in diameter. It was required to desalt crude oil containing 25–50 ptb. salt and .4–2.4% BS & W at a rate of 17,000 bbls./day by mixing 5% of fresh water with the oil. The mixture was produced by flow through a mixing valve inducing a pressure drop of about 2–20 p.s.i., the mixture entering the vessel at a temperature of 230–250° F. Aids to resolution included addition of a chemical demulsifying agent to the oil and employment of an electrostatic field in the oil zone. The interfacial zone was 3' above the bottom of the vessel.

Due to changing conditions, this desalter was required to process crude oil in the range of 17–21° API containing finely divided solids. Under the above conditions of operation these solids accumulated in the interfacial zone and stabilized the oil-water cuff. The build-up of the interfacial zone continued until in some cases the lower ⅓ of the vessel became filled with an oil-water-solids system. When this happened the water bleed would be so oily that it would be necessary to shut off the influent water and stop the desalting process. This situation existed for a number of months during which several thousand barrels of waste oil were accumulated. Attempts to cure the problem by increasing the amount of chemical agent failed to cure the problem either by avoiding the build-up of the interfacial material or clearing the water bleed.

It was found that the problem was completely cured by pumping kerosene at a rate of 200–300 bbls./day into the water zone of the vessel through 14 nozzles each ⅛" inside diameter positioned 24" above the bottom of the vessel. Indeed it was found that continuous injection of kerosene was not necessary and that the injection of kerosene once or twice a day for about one hour at a rate of 10 bbls./hr. would keep this desalter in continuous operation producing a clear water bleed and a desalted oil containing .3–.6% BS & W and only 3–11 ptb. of salt. With the modified operation it was also possible to resolve the accumulated waste oil by slowly feeding it into the salty crude oil being charged to the desalter.

Example 2

This desalter was originally designed to handle 65,000 bbls./day. Substantial amounts of demulsifying chemicals were used to aid in resolving the oil-water mixture produced when the salty crude oil was mixed with about 3–4% of fresh water and separated at about 270° F. Changing conditions required that the plant be overloaded to handle about 88,000 bbls./day. Trouble was experienced with the production of oily water bleeds and the accumulation of sludge in an interfacial zone that was approximately 37" above the bottom of the vessel. To cure the problem about 200 barrels of gas oil, heated to a temperature of about 300° F., was injected into the vessell every 8 hours by adding it to the suction of a circulating pump, like 65 in FIG. 1, drawing water from a level 18" above the bottom of the vessel and discharging the mixed water and gas oil at a level 37" above such bottom, namely at a level substantially identical with that of the interfacial zone. This significantly improved the operation and prevented the build-up of sludge in the interfacial zone. Occasionally a badly contaminated water bleed was still not completely cleared by this amount of gas oil injected at 8-hour intervals. The latter condition can be cured by injecting a lighter distillate, such as naphtha or kerosene, but for plant reasons this cannot be done at this particular installation.

Example 3

For three years this plant produced contaminated water bleeds containing approximately 2–3% of oil when desalting salty crude oil at a rate of 33,000 bbls./day at a temperature of approximately 260° F., the crude oil being of a gravity of 18–21° API. Under the same operating conditions the problem was cured by injecting hot kerosene into the body of water at a rate of approximately 4% by volume of the crude oil, the effluent water then containing only about 150 p.p.m. of oil.

Example 4

This plant initially operated satisfactorily in desalting crude oil at a rate of 40,000 bbls./day at a temperature of 255° F. employing 6% by volume of fresh water mixed with the oil, the effluent water containing only 100–1,000 p.p.m. of oil. Because of water-flooding, fire-flooding and steam-flooding of the formations supplying this crude oil, emulsion problems became progressively worse during several years of operation and the plant had to be shut down in recent months when the water effluent became half oil. The problem was cured by injecting 350 bbls./day of 60° API naphtha into the water zone through an orificed device such as indicated at 57 while introducing into the oil through the line 34 a small amount of an emulsion-breaking chemical or chemical demulsifying agent, the chemical being used in such small amount as to represent a cost of less than one-tenth cent per barrel of crude oil. The oil content of the effluent water was reduced to a value within the range found to exist when the plant was first operated. Stopping the naphtha injection caused the oil content of the effluent water to rise to 10%, an intolerable value in continuous operation of the plant. Restarting the naphtha injection again lowered the oil content to within the range specified above, showing the startling effect of the injection of naphtha. Even better operation and even less oil in the effluent water was observed in a test in which half of the chemical demusifying agent was added through the line 34 and half through the line 50 along with the naphtha, showing the benefit that can sometimes be obtained by adding a small amount of chemical demulsifying agent to the diluent that is being injected.

Various changes and modifications can be made without departing from the spirit of the invention as defined in the appended claims.

I claim:
1. A process for continuously separating oil-water mixtures in a separating vessel, including the steps of:
   separating in the separating vessel by gravity said oil-water mixture to form in said vessel an upper oil body, a lower water body contaminated by dispersed oil droplets, and an interfacial cuff in an interfacial zone between said bodies;
   injecting in subdivided form into said water body in said vessel at a position below said interfacial zone a petroleum fraction boiling in the range of about 150–625° F. that is of higher API gravity than the oil of said mixture and that is of lower density than the water of said water body to wash up through the body of water to the interfacial cuff material in said interfacial zone;
   withdrawing separated water from said lower water body in said vessel; and
   withdrawing from said upper oil body in said vessel separated oil containing said petroleum fraction.

2. A process as defined in claim 1 in which said petroleum fraction is a petroleum naphtha.

3. A process as defined in claim 1 in which said petroleum fraction is kerosene.

4. A process as defined in claim 1 in which said oil-water mixture contains water-insoluble solids that separate in large measure during said separating step to form in the vessel a solids layer below said water body, and including the steps of providing a solids outlet for such separated solids, withdrawing additional water from said body of water through said solids outlet, mechanically sweeping said solids in said solids layer toward said outlet and into the water being withdrawn therethrough, and subsequently separating the solids and water thus withdrawn.

5. A process for continuously separating oil-water mixtures in a separating vessel, including the steps of:
   separating in the separating vessel by gravity said oil-water mixture to form in said vessel an upper oil body, a lower water body and an interfacial cuff in an interfacial zone between said bodies of oil and water;
   diluting the material of said interfacial cuff in said interfacial zone by delivering thereto while in said vessel and without withdrawing said material therefrom a diluent in subdivided form, said diluent comprising a petroleum fraction boiling in the range of about 150–625° F. that is of higher API gravity than the oil of said mixture and of lower density than the water of said water body;
   withdrawing separated water from said lower water body in said vessel; and
   withdrawing from said upper oil body in said vessel separated oil containing said diluent.

6. A process for continuously separating oil-water mixtures containing water-insoluble solids, including the steps of:
   separating in a separating vessel by gravity said oil-water mixture to form in said vessel an upper oil body, a lower water body and an interfacial cuff in an interfacial zone between said bodies of oil and water, said interfacial cuff containing a substantial amount of said solids acting as an emulsifying agent for the cuff material;
   diluting the cuff material in situ by delivering to the interfacial zone in subdivided form a diluent comprising a petroleum fraction boiling in the range of about 150–625° F. that is of higher API gravity than the oil of said mixture and of lower density than the water of said water body, said diluent releasing the solids in the cuff material and rising to said upper oil body;
   settling the released solids through said body of water to form a body of solids at the bottom thereof;
   withdrawing from the bottom of said vessel water from said water body and at least some of the solids from said body of solids; and
   withdrawing oil and said diluent from said vessel from the upper oil body therein.

7. A process as defined in claim 6 including the steps of providing a solids outlet for such solids, withdrawing at least a portion of said separated water from said body of water through said solids outlet; and
   mechanically sweeping said solids toward said solids outlet and into the water being withdrawn therethrough 8. A process for continuously separating oil-continuous, oil-water mixtures containing water-insoluble solids in a closed container providing an oil outlet, a water outlet and a solids outlet, which process includes the steps of:
   introducing said oil-water mixture into said container and coalescing the water thereof by electric action;
   allowing the coalesced water to separate in the container into an upper oil body extending to said oil outlet, a lower water body extending to said water outlet and a solids layer below said water body extending to said solids outlet, there being an interfacial oil-water cuff in an interfacial zone between said oil and water bodies, the material of said interfacial cuff retaining a substantial portion of said solids acting as emulsifying agents for the oil and water thereof;
   diluting the oil-water material of said interfacial cuff in situ in said interfacial zone to release the solids of the cuff material, said dilution being effected by delivering in subdivided form to the interfacial zone a petroleum fraction boiling in the range of about 150–625° F.;

withdrawing separated oil and said diluent from said closed container through said oil outlet; and withdrawing separated water from said closed container through said water outlet.

9. A process as defined in claim 8 including the steps of periodically withdrawing water from the lower portion of said body of water through said solids outlet, mechanically sweeping solids from the layer thereof toward said solids outlet and into the water being withdrawn therethrough, and subsequently separating the solids and water thus withdrawn.

10. A process for continuously desalting salty crude oils, including the steps of:

continuously mixing with the salty oil about 1–15% by volume of fresh water to form an oil-water mixture;

continuously delivering said oil-water mixture to a separating zone and there separating same into an upper body of desalted oil, a lower water body containing the salts of the oil, and an interfacial oil-water cuff in an interfacial zone between said bodies of oil and water, said water body tending to become contaminated by dispersed oil droplets as said delivery of said oil-water mixture is continued;

injecting into said container at a plurality of positions in a horizontal plane no higher than the lower boundary of said interfacial zone a small amount of a petroleum fraction boiling in the range of about 150–625° F.;

withdrawing desalted oil and said petroleum fraction from said upper body thereof in said separating zone; and withdrawing from said lower water body salty water substantially free of dispersed oil droplets.

11. A process as defined in claim 10 in which the amount of said petroleum fraction is about 1–4% of the volume of said salty oil and in which a small amount of an organic chemical demulsifying agent is added to said petroleum fraction before said injection thereof, said petroleum fraction being introduced in subdivided form into said container at each of said plurality of positions.

12. In the desalting of salty crude oils by mixing about 1–15% of fresh water therewith and continuously separating the resulting oil-water mixture in a separating zone into a body of desalted oil and a body of water containing said salts, a process for preventing the progressive building up of a cuff layer in an interfacial zone between said bodies of oil and water, which process includes the steps of:

injecting a liquid comprising a petroleum fraction boiling in the range of about 150–625° F. into said separating zone at a plurality of positions in a horizontal plane no higher than said interfacial zone, the amount of injected fraction being about 1–4% based on the volume of said salty oil;

separately removing from said separating zone streams of desalted oil and separated water from the respective bodies thereof;

said petroleum fraction being separated with the stream of desalted oil as a diluent therefor.

13. A process as defined in claim 12 including the steps of withdrawing a stream of water from said body of water at a position below said horizontal zone, mixing with the withdrawn stream of water said petroleum fraction, and employing the resulting mixture as the liquid injected into said separating zone in said horizontal plane.

14. A process as defined in claim 13 in which the step of withdrawing said stream of water is effected by withdrawing a plurality of smaller streams of water from said body of separated water at a respective plurality of positions in a horizontal plane below said horizontal plane in which said liquid is injected into said separating zone, and combining said smaller streams to form said withdrawn stream with which said petroleum fraction is mixed.

15. In the desalting of salty crude oils also containing water-insoluble solids by mixing about 1–15% of fresh water therewith and separating the resulting oil-water mixture in a closed container into a body of desalted oil withdrawable through an oil outlet, a body of separated water now containing the salts and withdrawable through a water outlet, and a layer of solids in the bottom of said container below said body of separated water, a process for preventing the progressive building up of an oil-water interfacial cuff in an interfacial zone between said bodies of oil and water and stabilized by significant amount of said solids retained therein, said process including the steps of:

injecting an oil diluent into said container at a plurality of positions in a horizontal plane near the top of said separated water body, said diluent comprising a petroleum fraction boiling in the range of about 150–625° F.;

withdrawing said diluent with said desalted oil through said oil outlet as a diluent for said treated oil;

settling water-insoluble solids from said interfacial zone through said body of separated water to said layer of solids;

withdrawing said water containing said salts from said water outlet;

at least periodically withdrawing a portion of the water of said water body through said solids outlet;

mechanically sweeping solids from said layer of solids toward said solids outlet and into the water being withdrawn therethrough; and subsequently separating the solids and water thus withdrawn.

References Cited

UNITED STATES PATENTS

| 2,446,040 | 7/1948 | Blair. | |
| 2,235,639 | 3/1941 | Koch | 208—188 |
| 2,354,856 | 8/1944 | Erwin | 208—187 |
| 3,245,466 | 4/1966 | Hitzman | 252—327 |

DELBERT E. GANTZ, *Primary Examiner.*

G. J. CRASANAKIS, *Assistant Examiner.*